United States Patent
Matsumura

(10) Patent No.: US 10,921,774 B2
(45) Date of Patent: Feb. 16, 2021

(54) MACHINE LEARNING DEVICES AND METHODS FOR OPTIMIZING THE SPEED AND ACCURACY OF THREAD MILL, INNER DIAMETER, OUTER SHAPE, AND SURFACE MACHINE TOOLS

(71) Applicant: FANUC CORPORATION, Yamanashi (JP)

(72) Inventor: Hiroshi Matsumura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/031,279

(22) Filed: Jul. 10, 2018

(65) Prior Publication Data

US 2019/0025794 A1  Jan. 24, 2019

(30) Foreign Application Priority Data

Jul. 21, 2017  (JP) .............................. JP2017-141707

(51) Int. Cl.
    *G05B 19/404*  (2006.01)
(52) U.S. Cl.
    CPC .. *G05B 19/404* (2013.01); *G05B 2219/33034* (2013.01); *G05B 2219/45044* (2013.01)
(58) Field of Classification Search
    USPC ........................................................ 700/160
    See application file for complete search history.

(56) References Cited

U.S. PATENT DOCUMENTS

2017/0031328 A1* 2/2017 Sawada ................ G05B 13/028

FOREIGN PATENT DOCUMENTS

| CN | 106483934 | | 3/2017 | | |
|----|-----------|---|--------|---|---|
| JP | 59-042249 | | 3/1984 | | |
| JP | 5942249 | * | 3/1984 | ............ | B23W 15/14 |
| JP | 06-091479 | | 4/1994 | | |
| JP | 0691479 | * | 4/1994 | ............ | B23Q 15/00 |

(Continued)

OTHER PUBLICATIONS

Machine Translation of JP-5942249 (Year: 1984).*

(Continued)

*Primary Examiner* — Robert E Fennema
*Assistant Examiner* — Christopher W Carter
(74) *Attorney, Agent, or Firm* — Wenderoth, Lind & Ponack, L.L.P.

(57) ABSTRACT

A machine learning device performs machine learning with respect to a numerical control device that operates a machine tool on the basis of a machining program. The machine learning device includes a state information acquisition unit configured to acquire state information including conditions of a spindle speed, a feed rate, a number of cuts, and a cutting amount per one time or a tool compensation amount, and a cycle time of cutting a workpiece, and machining accuracy of the workpiece; an action information output unit configured to output action information including modification information of the condition; a reward output unit configured to output a reward value in reinforcement learning on the basis of the cycle time and the machining accuracy; and a value function updating unit configured to update an action value function on the basis of a reward value, the state information, and the action information.

7 Claims, 10 Drawing Sheets

(56) References Cited

FOREIGN PATENT DOCUMENTS

| JP | 8-185211 | | 7/1996 | |
|---|---|---|---|---|
| JP | 2000-127040 | | 5/2000 | |
| JP | 2000127040 | * | 5/2000 | ............. B24B 51/00 |
| JP | 2011-158982 | | 8/2011 | |
| JP | 2011158982 | * | 8/2011 | ........... G05B 19/416 |
| JP | 2011158982 A | * | 8/2011 | ......... G05B 19/4155 |
| JP | 6063016 | | 1/2017 | |
| JP | 2017-030067 | | 2/2017 | |
| JP | 2017030067 | * | 2/2017 | ............. B23Q 15/00 |
| JP | 2017030067 A | * | 2/2017 | ............. G05B 13/028 |
| WO | WO-2004089569 A1 | * | 10/2004 | ............. B23F 15/08 |

OTHER PUBLICATIONS

Machine Translation of JP-0691479 (Year: 1994).*
Zilouchian et al., Neural Network Controller for Turning Operation of a Metal Cutting Process, Jun. 1995, IEEE, 1995 American Control Conference, 713-717 (Year: 1995).*
Li et al., A Hierarchical Intelligent Control System for Milling Machine, Oct. 28-31, 1997, IEEE, 1997 IEEE International Conference on Intelligent Processing Systems, 813-817. (Year: 1997).*
Machine Translation of JP-2000127040 (Year: 2000).*
Joo, Neural Network-based Dynamic Planning Model for Process Parameter Determination, Conference on Computational Intelligence for Modelling, Control and Automation and International Conference on Intelligent Agents, Web Technologies and Internet Commerce, Jan. 2005, IEEE, CIMCA-IAWTIC'05. (Year: 2005).*
Machine Translation of JP-2011158982 (Year: 2011).*
Yeh et al., Optimal Tuning of Control Gains for Rigid Tapping Processes Using a Learning Automata Methodology, May 1, 2015, IEEE, 2015 IEEE Congress on Evolutionary Computation (CEC), 3245-3255. (Year: 2015).*
Machine Translation of JP-2017030067 (Year: 2017).*
Rangwala et al. Learning and optimization of machining operations using computing abilities of neural networks. Mar. 1, 1989. IEEE Explore, IEEE Transactions on Systems, Man, and Cybernetics. vol. 19, No. 2. pp. 299-314. (Year: 1989).*
Machine Translation of WO 2004089569 A1. (Year: 2004).*
Notification of Reasons for Refusal dated Apr. 16, 2019 in corresponding Japanese Patent Application No. 2017-141707.
Decision of Refusal dated Jun. 25, 2019 in Japanese Patent Application No. 2017-141707.
Office Action dated Apr. 28, 2020 in corresponding Chinese Patent Application No. 201810792076.0.

* cited by examiner

MACHINE LEARNING DEVICES AND METHODS FOR OPTIMIZING THE SPEED AND ACCURACY OF THREAD MILL, INNER DIAMETER, OUTER SHAPE, AND SURFACE MACHINE TOOLS

This application is based on and claims the benefit of priority from Japanese Patent Application No. 2017-141707, filed on 21 Jul. 2017, the content of which is incorporated herein by reference.

BACKGROUND OF THE INVENTION

Field of the Invention

The present invention relates to a machine learning device, a numerical control device, a numerical control system, and a machine learning method.

Related Art

One example of screw hole machining is thread milling machining. The thread milling machining is machining consisting of, after a hole is opened in a workpiece by drilling, performing side surface machining of the hole by helical interpolation using, instead of tapping, a tool called a thread mill to produce a thread by cutting. The machining using a thread mill has the following characteristics, as compared to the machining using tapping.
(1) Since the machining using the thread mill is machining using a tool having a smaller diameter than the inner diameter of a female screw, a chip is unlikely to develop, and thereby, a tool is unlikely to break suddenly during machining.
(2) In the machining using the thread mill, there is no need to synchronize rotation and feed rate of a blade, as there is with tapping, and a speed and the feed rate of a blade can be freely adjusted.

Techniques of improving machining accuracy of machining are disclosed in Patent Documents 1 and 2. Patent Document 1 discloses a technique of machining, measuring, and evaluating a first workpiece and modifying a path of a machining program by using the result of the evaluation. This technique improves machining accuracy of a second workpiece and workpieces thereafter. Patent Document 2 discloses a technique of learning whether an abnormality occurs in a machine from a load, temperature, and vibration of a motor, and adjusting a machining condition such as a feed rate and a spindle speed. This technique improves machining accuracy.

Patent Document 1: Japanese Unexamined Patent Application, Publication No. H08-185211
Patent Document 2: Japanese Patent No. 6063016

SUMMARY OF THE INVENTION

Regarding machining by a thread mill, in consideration of the base materials of a tool and a workpiece, in order to achieve the shortest machining time while maintaining the accuracy of a screw, adjustment of an appropriate machining condition related to rotation of the tool and movement of the tool or the workpiece is required. Therefore, machining by the thread mill has a problem of taking time for adjustment. Not limited to the thread milling machining, even in inner diameter machining, outer shape machining, and surface machining, similarly, in order to achieve the shortest machining time while maintaining the machining accuracy, adjustment of an appropriate machining condition related to rotation of the tool and movement of the tool or the workpiece is required.

An object of the present invention is to provide a machine learning device, a numerical control device, a numerical control system, and a machine learning method capable of reducing machining time while maintaining machining accuracy by determining an appropriate machining condition through machine learning.

(1) A machine learning device according to the present invention is a machine learning device (for example, a machine learning device 300 described later) that is configured to perform machine learning with respect to a numerical control device (for example, a numerical control device 200 described later) that operates a machine tool (for example, a machine tool 100 described later) on the basis of a machining program, the machine learning device including: a state information acquisition unit (for example, a state information acquisition unit 301 described later) configured to acquire state information including a setting value, a cycle time of cutting a workpiece, and machining accuracy of the workpiece, the setting value including a spindle speed, a feed rate, the number of cuts, and a cutting amount per one time or a tool compensation amount;
an action information output unit (for example, an action information output unit 303 described later) configured to output action information including modification information of the setting value included in the state information to the numerical control device;
a reward output unit (for example, a reward output unit 3021 described later) configured to output a reward value in reinforcement learning on the basis of the cycle time and the machining accuracy included in the state information; and
a value function updating unit (for example, a value function updating unit 3022 described later) configured to update an action value function on the basis of a reward value output by the reward output unit, the state information, and the action information,
the spindle speed, the feed rate, the number of cuts, and the cutting amount per one time or the tool compensation amount being set in a predetermined machining program,
the numerical control device causing the tool machine to perform cutting by executing the machining program, and the cycle time and the machining accuracy being acquired by the numerical control device performing the machining program.

(2) In the machine learning device according to (1) described above, the machine learning may be continued without a maximum number of trials of the machine learning that is provided.

(3) In the machine learning device according to (1) or (2) described above, the machine learning may be performed in any of thread milling machining, inner diameter machining, outer shape machining, and surface machining of the machine tool.

(4) In the machine learning device according to any of (1) to (3) described above, the machine learning device may include an optimizing action information output unit (for example, an optimizing action information output unit 305 described later) configured to generate and output the spindle speed, the feed rate, the number of cuts, and the cutting amount per one time or the tool compensation amount, on the basis of a value function updated by the value function updating unit.

(5) A numerical control system according to the present invention is a numerical control system having the machine learning device according to any of (1) to (4) described above and a numerical control device in which a spindle speed, a feed rate, a number of cuts, and a cutting amount per one time or a tool compensation amount of a machining program are mechanically learned by the machine learning device.

(6) A numerical control device according to the present invention is a numerical control device that includes the machine learning device according to any of (1) to (4) described above, and is configured to perform machine learning of a spindle speed, a feed rate, a number of cuts, and a cutting amount per one time or a tool compensation amount by the machine learning device.

(7) A machine learning method according to the present invention is a machine learning method of a machine learning device (for example, a machine learning device 300 described later) configured to perform machine learning with respect to a numerical control device (for example, a numerical control device 200 described later) that operates a machine tool (for example, a machine tool 100 described later) on the basis of a machining program, the machine learning method including:
acquiring state information including a setting value, and a cycle time of cutting a workpiece, and machining accuracy of the workpiece, the setting value including a spindle speed, a feed rate, the number of cuts, and a cutting amount per one time or a tool compensation amount;
outputting action information including modification information of the setting value included in the state information, to the numerical control device;
calculating a reward value in reinforcement learning based on the cycle time and the machining accuracy included in the state information; and
updating an action value function on the basis of the reward value that has been calculated, the state information, and the action information,
the spindle speed, the feed rate, the number of cuts, and the cutting amount per one time or the tool compensation amount being set in a predetermined machining program,
the numerical control device causing the machine tool to perform cutting by executing the machining program, and
the cycle time and the machining accuracy being acquired by the numerical control device performing the machining program.

According to the present invention, machining time can be reduced while maintaining machining accuracy by determining an appropriate machining condition by machine learning. Since machining accuracy can be maintained even in a tool that has been used for a long time, by determining an appropriate machining condition in accordance with a situation, the lifespan of a tool can be extended.

DETAILED DESCRIPTION OF THE INVENTION

Embodiments of the present invention will be described in detail below with reference to drawings.

First Embodiment

Figure 1:
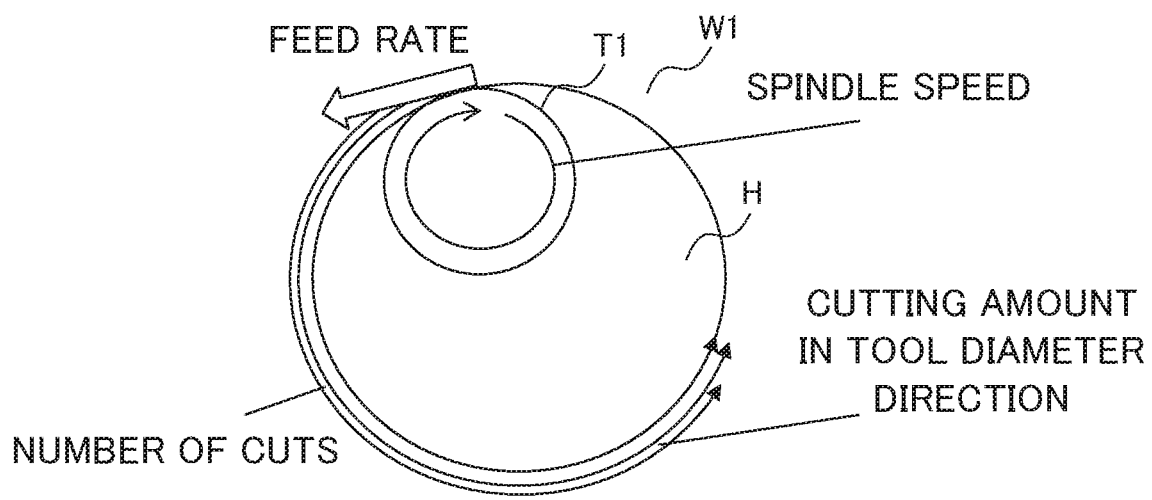
FIG. 1 is an explanatory diagram of thread milling machining.

A numerical control system of the present embodiment includes a numerical control device and a machine learning device and is suitably used when thread milling machining is performed by a machine tool. The present embodiment is described with thread milling machining as an example. However, the present invention is not particularly limited to thread milling machining. As shown in FIG. 1, machining using a thread mill is machining of opening a hole H in a workpiece W1 by drilling and then performing side surface machining of the hole H by helical interpolation by using a thread mill T1 to produce a thread by cutting. Regarding machining using a thread mill, in consideration of the base materials of a tool and a workpiece, in order to achieve shorter machining time while maintaining the accuracy of a screw, as shown in FIG. 1, adjustment of a spindle speed, a feed rate, the number of cuts in a tool diameter direction, and a cutting amount per one time in the tool diameter direction of a spindle that rotates the thread mill T1 serving as a tool is required. The spindle speed, the feed rate, the number of cuts in the tool diameter direction, and the cutting amount per one time in the tool diameter direction of the spindle change depending on conditions such as a geometry of the workpiece, a material of the workpiece, an outer shape of the tool (the diameter, the number of blades, and the like), and a material of the tool.

Figure 2:
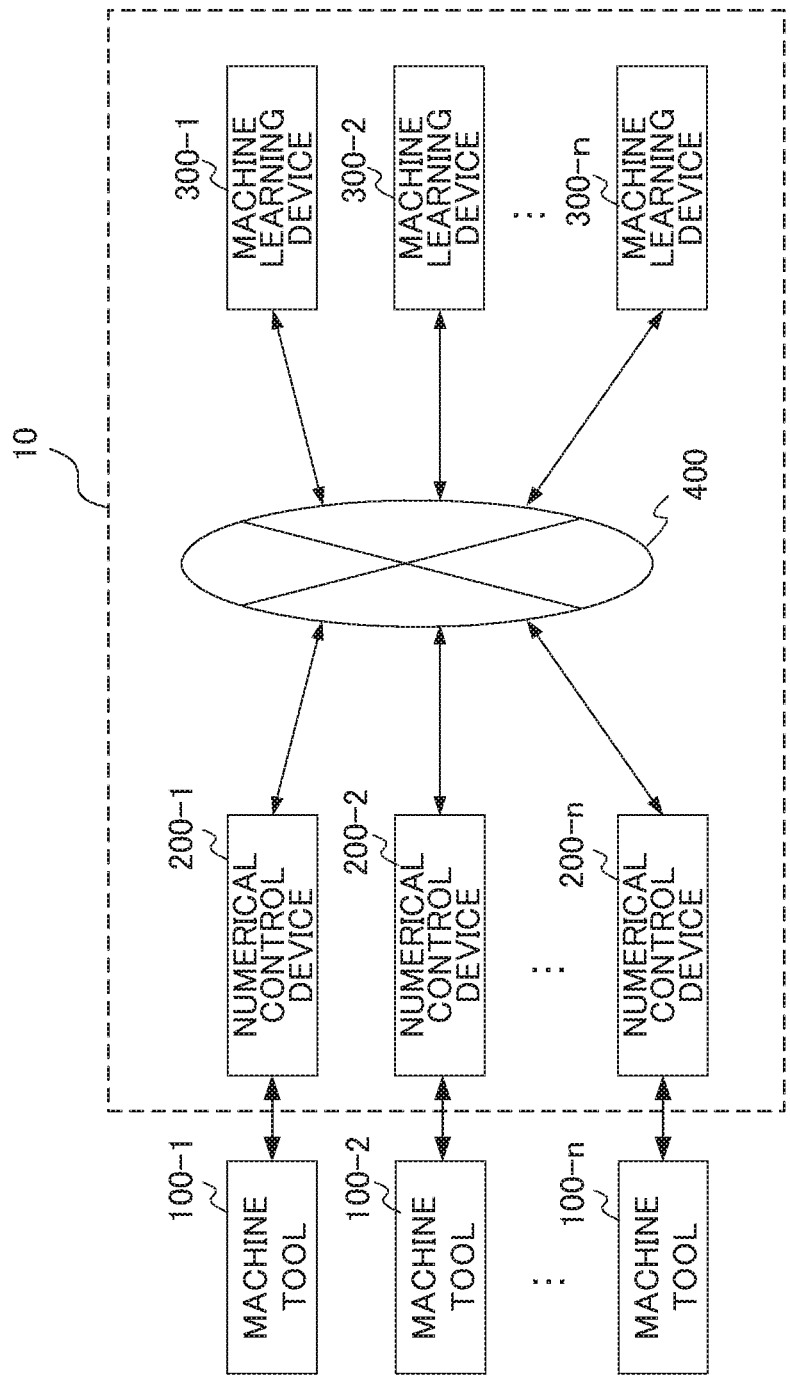
FIG. 2 is a block diagram showing a numerical control system and a machine tool of a first embodiment of the present invention.

FIG. 2 is a block diagram showing a numerical control system and a machine tool of the first embodiment of the present invention. As shown in FIG. 2, a numerical control system 10 includes n numerical control devices 200-1 to 200-n, a network 400, and machine learning devices 300-1 to 300-n connected to the numerical control devices 200-1 to 200-n via the network 400. The n machine tools 100-1 to 100-n are connected to the n numerical control devices 200-1 to 200-n. Note that n is an arbitrary natural number.

The machine tool 100-1 and the numerical control device 200-1 are considered to be a set of one-to-one and are communicatively connected. The machine tool 100-2 to 100-n and the numerical control devices 200-2 to 200-n are connected in the same way as the machine tool 100-1 and the numerical control device 200-1.

n sets of the machine tools 100-1 to 100-n and the numerical control devices 200-1 to 200-n may be directly connected via a connection interface or connected via a network such as a local area network (LAN). For example, a plurality of n sets of the machine tools 100-1 to 100-n, and the numerical control devices 200-1 to 200-n may be installed in the same factory or in different factories.

The numerical control device 200-1 and a machine learning device 300-1 are considered to be a set of one-to-one and are communicatively connected. The numerical control devices 200-2 to 200-n and the machine learning devices 300-2 to 300-n are connected in the same way as the numerical control device 200-1 and the machine learning device 300-1. In FIG. 1, n sets of the numerical control devices 200-1 to 200-n and the machine learning devices 300-1 to 300-n are connected via the network 400. However, regarding the n sets of the numerical control devices 200-1 to 200-n and the machine learning devices 300-1 to 300-n, the numerical control devices and the machine learning devices in each of the sets may be directly connected via a connection interface. The network 400 is, for example, a local area network (LAN) constructed in a factory, the Internet, a public telephone network, or combination thereof. The communication method in the network 400, whether a wired connection or a wireless connection is used, is not particularly limited.

Figure 3:
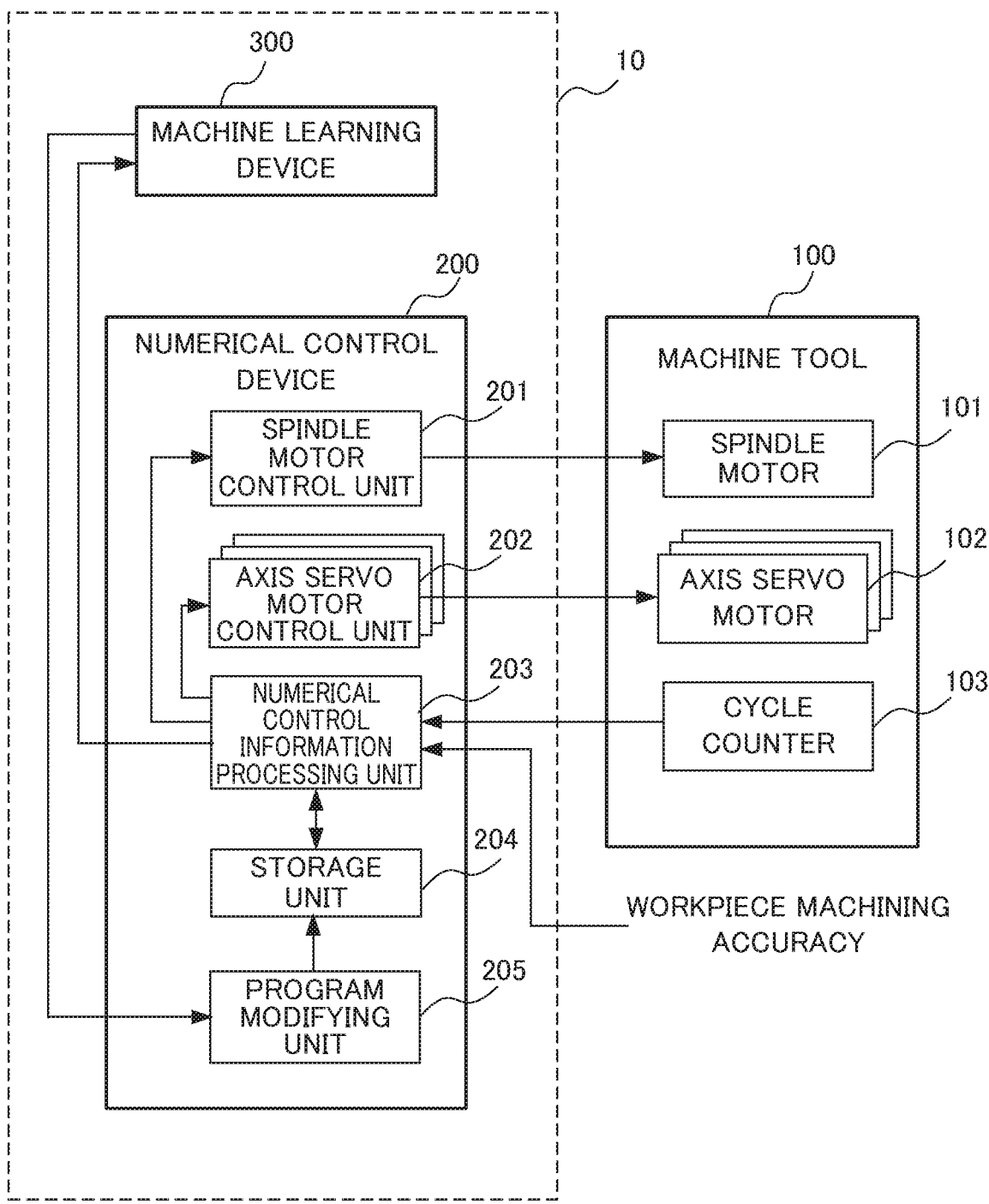
FIG. 3 is a block diagram showing configurations of a numerical control device of the numerical control system and the machine tool of the first embodiment of the present invention.
Figure 4:
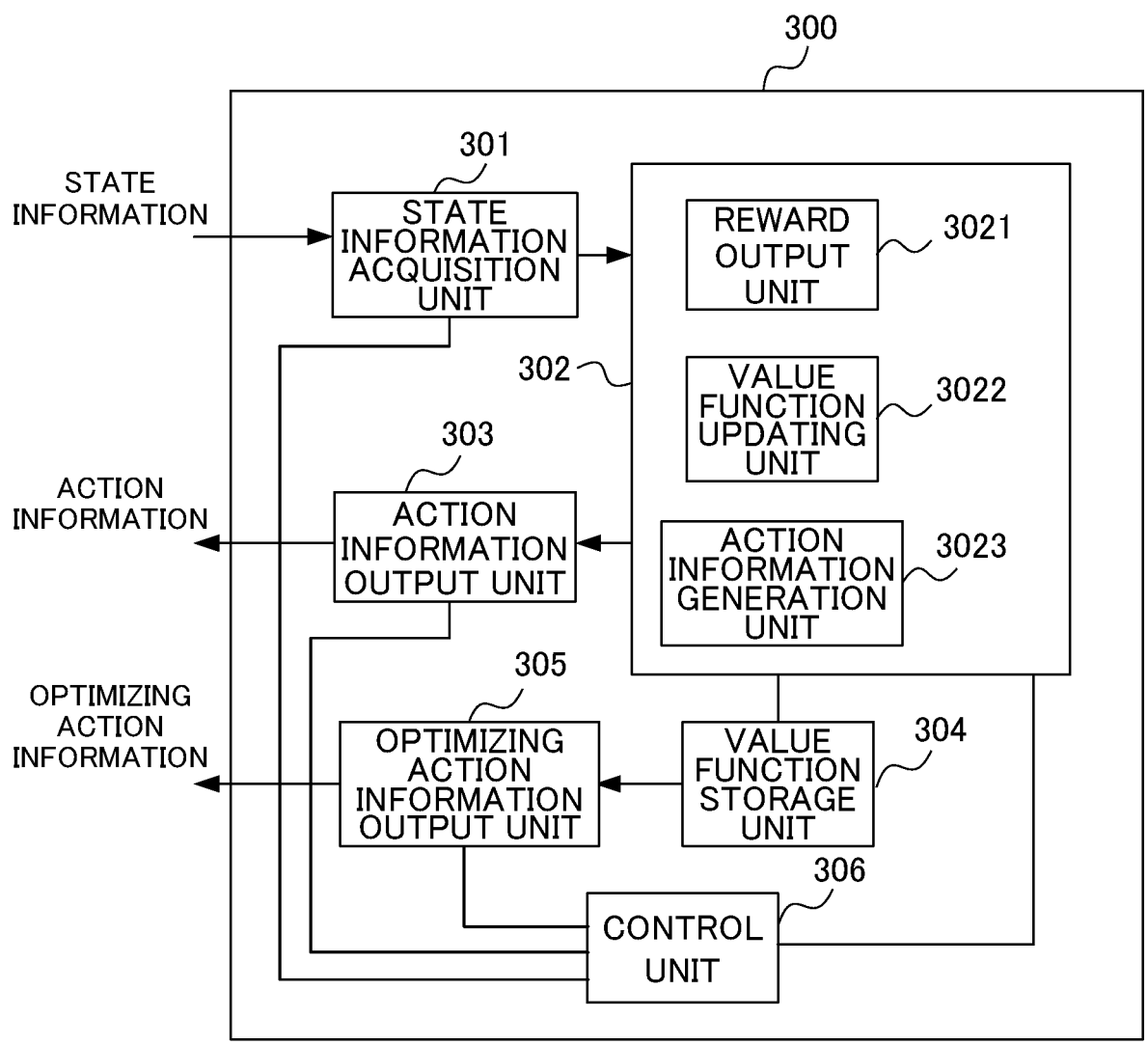
FIG. 4 is a block diagram showing a configuration of a machine learning device.

Next, configurations of the machine tools 100-1 to 100-n, the numerical control devices 200-1 to 200-n, and the machine learning devices 300-1 to 300-n included in the numerical control system 10 will be described. FIG. 3 is a block diagram showing configurations of a numerical control device 200 of the numerical control system 10, and a machine tool 100 of the first embodiment of the present invention. FIG. 4 is a block diagram showing a configuration of a machine learning device 300. The machine tool 100 of FIG. 3, the numerical control device 200 of FIG. 3, and the machine learning device 300 shown in FIG. 4 correspond to, for example, the machine tool 100-1, the numerical control device 200-1 and the machine learning device 300-1 shown in FIG. 2, respectively. The machine tools 100-2 to 100-n, the numerical control devices 200-2 to 200-n, and the machine learning devices 300-2 to 300-n also have the same configurations.

First, the machine tool 100 will be described. The machine tool 100 performs thread milling machining in accordance with a command generated on the basis of a machining program set in the numerical control device 200. The machine tool includes a spindle motor 101, an axis servo motor 102, and a cycle counter 103.

The spindle motor 101 is a spindle motor for rotating a thread mill. The thread mill is attached to a rotation axis of the spindle motor 101.

The axis servo motor 102 is a servo motor that spirally moves the thread mill with respect to a hole of the workpiece. The axis servo motor 102 shown in FIG. 3 is composed of three axis servo motors provided with respect to an X axis direction, a Y axis direction, and a Z axis direction. A rotation axis of the axis servo motor 102 in the X axis direction, the Y axis direction, and the Z axis direction are rotated. As a result, the thread mill is spirally moved by a ball screw connected to the axis servo motor 102 or the like. Here, the axis servo motor 102 spirally drives the thread mill. However, while the axis servo motor provided with respect to the X axis direction and the Y axis direction moves a table mounted with the workpiece in the X axis direction and the Y axis direction, the axis servo motor provided with respect to the Z axis direction may move the thread mill in the Z axis direction so that the thread mill spirally moves relatively to the workpiece.

The cycle counter 103 is a counter for measuring the cycle time that is machining time that was required for thread milling machining when the machine tool 100 has performed the thread milling machining. The cycle time measured by the cycle counter 103 is output to the numerical control device 200.

The numerical control device 200 is a device that controls the machine tool 100 so that the machine tool 100 performs thread milling machining. The numerical control device 200 transmits state information (also referred to as "status") to the machine learning device 300. The numerical control device 200 receives action information (also referred to as "action") from the machine learning device 300. Details of each piece of information will be described in the description of the machine learning device 300.

The numerical control device 200 includes a spindle motor control unit 201, an axis servo motor control unit 202, a numerical control information processing unit 203, a storage unit 204, and a program modifying unit 205.

The spindle motor control unit 201 generates a torque command on the basis of an operation command from the numerical control information processing unit 203 and transmits the generated torque command to the machine tool 100, thereby controlling rotation of the spindle motor 101 of the machine tool 100. The axis servo motor control unit 202 generates a torque command on the basis of a position command from the numerical control information processing unit 203, and transmits the generated torque command to the machine tool 100, thereby controlling rotation of the axis servo motor 102 in the X axis direction, the Y axis direction, and the Z axis direction of the machine tool 100. The axis servo motor control unit 202 is composed of three axis servo motor control units that control three axis servo motors provided with respect to the X axis direction, the Y axis direction, and the Z axis direction.

The numerical control information processing unit 203 transmits an operation command to the spindle motor control unit 201, and a position command to the axis servo motor control unit 202, on the basis of a machining program stored in the storage unit 204. The numerical control information processing unit 203 acquires the cycle time output from the cycle counter 103 of the machine tool 100 and the machining accuracy of the workpiece with which thread milling machining is performed and transmits the cycle time and the machining accuracy to the machine learning device 300 as state information. The machining accuracy of the workpiece is measured by a three-dimensional measurement device or the like and is input to the numerical control information processing unit 203. The machine tool 100 may have a measurement function of the machining accuracy of the workpiece.

The machining accuracy of the screw machining in the workpiece includes a determination result on whether the machining accuracy is in an appropriate range. Whether the machining accuracy is in the appropriate range can be determined by a three-dimensional measurement device or the like. However, for example, whether a passing side of a screw gauge can pass through a screw hole machined by thread milling machining and whether a stop side exceeds two rotations to enter the screw hole can be determined through a trial by an observer or a robot. If the machining accuracy is not in the appropriate range due to the screw hole being small, it is determined to be insufficient cutting. If the machining accuracy is not in the appropriate range due to the screw hole being large, it is determined to be too much cutting. When the machining accuracy is in the appropriate range, the machining accuracy of the screw manufactured in the workpiece may be such that, for example, a tolerance range class of a female screw includes an evaluation result evaluated by tolerance qualities of "high," "medium," and "low" described in Table 8 of JIS B0209-1:2001 (corresponding to "ISO 965-1:1998"). The tolerance quality is measured by a three-dimensional measurement device or the like. The tolerance quality has higher machining accuracy in the order of "high," "medium," and "low."

The numerical control information processing unit 203 transmits the spindle speed, the feed rate, the number of cuts, and the cutting amount per one time that have been set by the machining program to the machine learning device 300 as the state information.

The program modifying unit 205 directly modifies the machining program. Specifically, the program modifying unit 205 modifies a program code of the spindle speed, the feed rate, the number of cuts, and the cutting amount per one time described by the machining program, on the basis of the action information output from the machine learning device 300 and the optimizing action information.

The configurations of the machine tool 100 and the numerical control device 200 are described above, and the configurations described above are portions particularly related to the operation of the present embodiment. Details of each configuration of the machine tool 100 and the numerical control device 200, for example, a position and velocity detector for performing position and velocity feedback with respect to the axis servo motor control unit, a motor drive amplifier that amplifies an operation command, an operator's panel for receiving the operations of a user, and the like are well known by a skilled person. Therefore, detailed descriptions and illustrations thereof are omitted.

<Machine Learning Device 300>

The machine learning device 300 is a device that performs machine learning of a spindle speed, a feed rate, the number of cuts, and a cutting amount per one time of when the machine tool 100 is operated, by executing the machining program by the numerical control device 200.

Before each function block included in the machine learning device 300 is described, the basic mechanism of the reinforcement learning will be described. An agent (corresponding to the machine learning device 300 in the present embodiment) observes an environmental state and selects one action. Then, the environment changes on the basis of that action. Some reward is given in accordance with the environmental change, and the agent learns the selection (decision) of a better action. While supervised learning presents a completely correct result, the reward in the reinforcement learning is often presented as a fragmental value based on a change in part of the environment. Thus, the agent learns to select an action so that the total reward in the future is maximized.

In this way, with reinforcement learning, the machine learning device 300 learns to learn a suitable action in consideration of a mutual effect of the action with the environment, that is, an action for maximizing the reward to be obtained in the future. This represents that, in the present embodiment, an action that affects the future such as selecting action information for reducing the cycle time while maintaining the machining accuracy is gained.

As the reinforcement learning, an arbitrary learning method can be used. In the description below, a case where Q-learning, which is a method of learning a value function Q (S, A) and selecting an action A under an environmental state s, is used will be described as an example. An object of Q-learning is to select the action a having the highest value function Q (S, A) as an optimal action, from among actions A that can be taken in a state S.

However, at the time when Q-learning is initially performed, regarding a combination of the state S and the action A, the correct value of the value function Q (S, A) is not identified at all. Thus, the agent selects various actions A under a condition S and selects a better action on the basis of the given reward with respect to the action A at that time, to learn the correct value function Q (S, A).

The agent tries to finally obtain Q (S, A)=E[Σ(γ$^t$)r$_t$] in order to maximize the total reward that can be obtained in the future. E[ ] represents an expected value, t represents time, γ represents a parameter called a discount rate described later, r$_t$ is a reward at the time t, and Σ represents the total at the time t. The expected value in this formula is an expected value in a case where the state is changed according to the optimal action. However, the optimal action is not clear in the process of Q-learning. Therefore, the agent takes various actions to perform the reinforcement learning while searching. An updating formula of such value function Q (S, A) can be represented by, for example, the following formula 1 (shown as Formula 1 below).

$$Q(S_{t+1}, A_{t+1}) \leftarrow Q(S_t, A_t) + \alpha \left( r_{t+1} + \gamma \max_A Q(S_{t+1}, A) - Q(S_t, A_t) \right) \quad \text{[Formula 1]}$$

In the formula 1 described above, $S_t$ represents an environmental state at the time t, and $A_t$ represents an action at the time t. The state is changed to $S_{t+1}$ by the action $A_t$. $r_{t+1}$ represents a reward obtained by that state change. An item added with max is obtained by multiplying γ with the Q value of when the action A having the highest Q value that has been identified at that time is selected, under the state $S_{t+1}$. The γ is a parameter of 0<γ≤1 and is called a discount rate. α is a learning coefficient and is in a range of 0<α≤1.

The formula 1 described above represents a method of updating the value function Q ($S_t$, $A_t$) of the action $A_t$ in the state $S_t$, on the basis of the reward $r_{t+1}$ sent back as a result of the action A. This updating formula represents that the Q ($S_t$, $A_t$) is set to be large when a value $\max_a$ Q($S_{t+1}$, A) of the best action in the next state $S_{t+1}$ by the action $A_t$ is larger than the value function Q ($S_t$, $A_t$) of the action $A_t$ in the state $S_t$, while, the Q ($S_t$, $A_t$) is set to be small when the value $\max_a$ Q($S_{t+1}$, A) of the best action in the next state $S_{t+1}$ by the action $A_t$ is smaller. That is, the updating formula indicates that a value of an action in a state is approximated to a value of the best action in the next state by the action. The difference between the values of the actions changes depending on the discount rate γ and the reward $r_{t+1}$. However, a value of the best action in a state is basically propagated to a value of an action in a state that is one before that state.

In Q-learning, there is a method of learning by creating a table of Q (S, A) for every state action pair (S, A). However, when the values of the Q (S, A) of all state action pairs are determined, the number of states is too large, and there is a case where a substantial amount of time is required for settling the Q-learning with the method.

Thus, a known technique called a Deep Q-Network (DQN) may be utilized during Q-learning. Specifically, in the DQN, the value function Q is configured by using an appropriate neural network and the parameters of the neural network are adjusted. As a result, the value function Q is approximated by the appropriate neural network, and the value of the value function Q (S, A) is calculated. The time required for settling Q-learning can be reduced by utilizing the DQN. The DQN is described in detail in, for example, the Non-Patent Document below.

<Non-Patent Document>

"Human-level control through deep reinforcement learning", Volodymyr Mnih1 [online], [searched on Jan. 17, 2017], Internet <URL: http://files.davidqiu.com/research/nature14236.pdf>

The Q-learning described above is performed by the machine learning device 300. Specifically, the machine learning device 300 sets a spindle speed, a feed rate, the number of cuts, and a cutting amount per one time of the machining program of the numerical control device 200, the cycle time, and the machining accuracy of the workpiece to be the state S, sets adjustment of a spindle speed, a feed rate, the number of cuts, and a cutting amount per one time related to the state S to be the action A, and learns the value function Q to be selected.

The machine learning device 300 observes the state information S including the spindle speed, the feed rate, the number of cuts, and the cutting amount per one time of the machining program and the cycle time and the machining accuracy of the workpiece acquired by executing the machining program to determine the action A. The machine learning device 300 gives a reward for every time an action A is performed. The machine learning device 300, for example, searches an optimal action A so that the total reward in the future is maximized through trial and error. As a result, the machine learning device 300 can select the optimal action A (that is, the optimal spindle speed, feed rate, number of cuts, and cutting amount per one time) with respect to the state S including the cycle time and the machining accuracy of the workpiece acquired by executing the machining program.

That is, the machine learning device 300 can select the action A with which the value of the value function Q is maximized from among the actions A applied to the spindle speed, the feed rate, the number of cuts, and the cutting amount per one time of the machining program related to a state S on the basis of the value function Q that has been learned to select the action A (that is, the spindle speed, the feed rate, the number of cuts, and the cutting amount per one time of the machining program) with which the cycle time is shorter and the machining accuracy of the workpiece is higher.

FIG. 4 is a block diagram showing the machine learning device 300 of the first embodiment of the present invention. In order to perform the reinforcement learning described above, the machine learning device 300 includes, as shown in FIG. 4, a state information acquisition unit 301, a learning unit 302, an action information output unit 303, a value function storage unit 304, an optimizing action information output unit 305, and a control unit 306. The learning unit 302 includes a reward output unit 3021, a value function value updating unit 3022, and an action information generation unit 3023. The control unit 306 controls the operation of the state information acquisition unit 301, the learning unit 302, the action information output unit 303, and the optimizing action information output unit 305.

The state information acquisition unit 301 acquires the state S including the spindle speed, the feed rate, the number of cuts, and the cutting amount per one time of the machining program, and the cycle time and the machining accuracy of the workpiece acquired by executing the machining program from the numerical control device 200. This state information S corresponds to an environmental state S in Q-learning. The state information acquisition unit 301 outputs the acquired state information S to the learning unit 302. The spindle speed, the feed rate, the number of cuts, and the cutting amount per one time of the machining program at the time when Q-learning is initially started are set in advance by the user. The spindle speed, the feed rate, the number of cuts in the tool diameter direction, and the cutting amount per one time in the tool diameter direction of the spindle changes depending on conditions such as the geometry of the workpiece, the material of the workpiece, the outer shape of the tool (the diameter, the number of blades, and the like), the material of the tool, and the like, thereby being set by the user on the basis of these conditions. In the present embodiment, the machine learning device 300 adjusts the spindle speed, the feed rate, the number of cuts, and the cutting amount per one time that have each been set by the user to be more optimal using the reinforcement learning.

The learning unit 302 is a unit that learns the value function Q (S, A) of when an action A is selected under state information (an environmental state) S. Specifically, the learning unit 302 includes the reward output unit 3021, the value function updating unit 3022, and the action information generation unit 3023.

The reward output unit 3021 is a unit that calculates the reward for when the action A is selected under a state S. The reward output unit 3021 may calculate the reward on the basis of a plurality of evaluation items. The reward output unit 3021 may calculate the overall reward by weighting the reward calculated on the basis of the plurality of evaluation items. In the present embodiment, the reward output unit 3021 calculates the reward on the basis of the cycle time and the machining accuracy.

First, calculation of the reward based on the cycle time will be described. In a case where the state S has made a transition to the state S' by the action A, values of the cycle time of the machine tool 100 operated on the basis of the spindle speed, the feed rate, the number of cuts, and the cutting amount per one time of the machining program in the state S and the state S' are set to be a value T(S) and a value T(S'). The reward output unit 3021 calculates the reward based on the cycle time as below. When the value T(S')>the value T(S), the reward is set to be a negative value. When the value T(S')=the value T(S), the reward is set to be zero. When the value T(S')<the value T(S), the reward is set to be a positive value. For example, the value of the reward based on the cycle time can be set to be −5 when the cycle time value becomes longer, +5 when the cycle time value remains unchanged, and +10 when the cycle time value becomes shorter. The reward output unit 3021 may set the reward to be a positive value when the value T(S')=the value T(S), and set the reward for when the value (S')<the value T(S) to be a positive value that is larger than the reward for when the value T(S')=the value T(S).

Regarding the negative value for when the cycle time of the state S' after the action A is performed becomes longer than the cycle time in the prior state S (the value T(S')>the value T(S)), the negative value may become larger in accordance with the ratio. That is, the negative value may become larger in magnitude in accordance with a degree of increase of the length of the cycle time. On the other hand, regarding the positive value for when the cycle time of the state S' after the action A is performed becomes shorter than the cycle time in the prior state S (the value T(S')<the value T(S)), the positive value may become larger in accordance with the ratio. That is, the positive value may become larger in accordance with a degree of decrease of the length of the cycle time.

Next, calculation of the reward based on machining accuracy will be described. The reward output unit 3021 determines the reward on the basis of the machining accuracy of the workpiece manufactured by the machine tool 100 operated on the basis of the spindle speed, the feed rate, the number of cuts, and the cutting amount per one time of the machining program in the state S when the state S has made a transition to the state S' by the action A.

The reward output unit 3021 sets the reward to be a negative value when the machining accuracy is not in the appropriate range, on the basis of a determination result included in the machining accuracy of the workpiece, on whether the machining accuracy is in the appropriate range. The machining accuracy is not in the appropriate range when cutting is insufficient or too much. It is desirable that an absolute value of the negative value of the reward for when the machining accuracy of the screw manufactured in the workpiece is not in the appropriate range is set to be a value with which the overall reward becomes a large negative value so that a case where the machining accuracy is not in the appropriate range is not selected. This is because the machining accuracy not being in the appropriate range is not a preferable state for cutting, since an overly cut portion cannot be reproduced in the case of too much cutting, and additional cutting is required to be performed again in the case of insufficient cutting. In the case of too much cutting, the overly cut portion cannot be reproduced. Thus, the reward in the case of too much cutting can have a negative value that is larger in magnitude than the reward in the case of insufficient cutting. For example, the reward in the case of too much cutting can be −50, and the reward in the case of insufficient cutting can be −10.

When the machining accuracy is in the appropriate range, the reward output unit 3021 can calculate the reward, for example, as below, on the basis of the evaluation result on which of the "high," "medium," and "low" tolerance classifications of the tolerance quality of the female screw the machining accuracy of the workpiece corresponds to. When the tolerance quality is "low," the reward is set to be a first positive value. When the tolerance quality is "medium," the reward is set to be a second positive value that is larger than the first positive value. When the tolerance quality is "high," the reward is set to be a third positive value that is larger than the second positive value. The way to give the reward value is not limited thereto, and the reward may be set to be the same positive value irrespective of "high," "medium," or "low" classification. For example, the reward in cases of "high," "medium," and "low" can be set to be the same +10. Furthermore, the reward in the case of "low" may be zero, and the rewards in the cases of "medium" and "high" may be the same positive value.

The reward output unit 3021 calculates the overall reward on the basis of the reward based on the cycle time and the reward based on the machining accuracy, both of which are calculated as above. When the reward output unit 3021 calculates the overall reward, the calculation is not limited to addition. For example, weight addition may be performed, or an average value between the reward based on the cycle time and the reward based on the machining accuracy may be calculated. The method of calculating the overall reward can be set as is appropriate, in accordance with the priority of the cycle time and the machining accuracy. For example, when the cycle time is considered to be important, the reward output unit 3021 can perform weight addition by multiplying the reward based on the cycle time by a weight coefficient greater than 1 and adding the obtained value to the reward based on the machining accuracy.

The value function updating unit 3022 performs Q-learning on the basis of the state S, the action A, the state S' when the action A is applied to the state S, and the overall reward value calculated as described above to update the value function Q that the value function storage unit 304 stores. The updating of the value function Q may be performed by online learning, batch learning, or mind-batch learning. Online learning is a learning method of applying an action A to the current state S to update the value function Q immediately every time the state S makes a transition to a new state S'. Batch learning is a learning method of applying an action A to the current state S to repeat the transition of the state S to the new state S' to collect learning data and perform updating of the value function Q by using all of the collected learning data. Mini-batch learning is an intermediate learning method between the online learning and the batch learning and is a learning method of performing updating of the value function Q every time certain pieces of learning data are accumulated.

The action information generation unit 3023 selects the action A in a process of Q-learning with respect to the current state S. The action information generation unit 3023 generates the action information A in order to cause an operation (corresponding to the action A in Q-learning) of modifying the spindle speed, the feed rate, the number of cuts, and the cutting amount per one time of the machining program of the numerical control device 200 in the process of Q-learning to be performed, to output the generated action information A to the action information output unit 303.

More specifically, the action information generation unit 3023, for example, adjust the spindle speed, the feed rate, the number of cuts, and the cutting amount per one time of the machining program by the action A, thereby increasing or decreasing the spindle speed, the feed rate, the number of cuts, and the cutting amount per one time of the machining program included in the state S.

When the action information generation unit 3023 adjust the spindle speed, the feed rate, the number of cuts, and the cutting amount per one time of the machining program by the action A and the state makes a transition to the state S', the action information generation unit 3023 may select the machining condition (the spindle speed, the feed rate, the number of cuts, and the cutting amount per one time) of the next action A' in accordance with the state of the cycle time (increased, decreased, or unchanged), and the state of the machining accuracy (whether the machining accuracy is in the appropriate range, and which of the "high," "medium," or "low" tolerance classifications it corresponds to). For example, when the positive reward (the reward of a positive value) is given by decreasing of the cycle time, the machining accuracy is in the appropriate range, and the positive reward (the reward of a positive value) has been given since the tolerance class is "high," the action information generation unit 3023 may take as the next action A', for example, a measure of selecting the action A' with which the cycle time becomes smaller, such as incrementally increasing the feed rate, or incrementally increasing the cutting amount while decreasing the number of cuts.

When the state has made a transition to the state S', the positive reward (the reward of the positive value) is given by decreasing of the cycle time, the machining accuracy is in the appropriate range, and the tolerance class "low", the action information generation unit 3023 may take as the next action A', a measure of selecting the action A' with which the machining accuracy is improved, such as incrementally decreasing the cutting amount while increasing the number of cuts.

The action information generation unit 3023 may take a measure of selecting the action A' by a known method such as the greedy method of selecting the action A' having the highest value function Q (S, A) from among the values of the action A currently estimated, or the ε greedy method of randomly selecting the action A' with a small probability ε, and apart from that, selecting the action A' having the highest value function Q (S, A).

The action information output unit 303 is a unit that transmits the action information A output from the learning unit 302 to the numerical control device 200. The action information output unit 303 may generate a macro variable file as action information in which, for example, values of the spindle speed, the feed rate, the number of cuts, and the cutting amount per one time that are applied to a specific macro variable and output the generated macro variable file to the program modifying unit 205 of the numerical control device 200 via the network 400. The program modifying unit 205 reflects the action information (the spindle speed, the feed rate, the number of cuts, and the cutting amount per one time) to the value of the specific macro variable of the machining program stored in the storage unit 204 by using the received macro variable file. The numerical control information processing unit 203 executes the machining program including the specific macro variable. The method of generating the macro variable file and reflecting the action information to a value of the specific macro variable of the machining program by using the macro variable file is an example of a method of reflecting the action information to a machining program, and the method is not limited thereto.

The value function storage unit 304 is a storage device that stores the value function Q. The value function Q may be stored as a table (hereinafter referred to as an action value table) for, for example, every state S and action A. The value function Q stored in the value function storage unit 304 is updated by the value function updating unit 3022. The value function Q stored in the value function storage unit 304 may be shared with other machine learning devices 300 when the value function Q is shared among a plurality of machine learning devices 300, distributed reinforcement learning can be performed by the machine learning devices 300. Thus, the efficiency of the reinforcement learning can be improved.

The optimizing action information output unit 305 creates the action information A (hereinafter, referred to as "optimizing action information") for causing the machine tool 100 to perform an operation with which the value function Q (S, A) is maximized on the basis of the value function Q that has been updated by performing Q-learning by the value function updating unit 3022. More specifically, the optimizing action information output unit 305 acquires the value function Q stored in the value function storage unit 304. This value function Q is updated by the value function updating unit 3022 performing Q-learning as described above. Then, the optimizing action information output unit 305 creates the action information on the basis of the value function Q to output the created action information to the program modifying unit 205. This optimizing action information includes information of modifying the spindle speed, the feed rate, the number of cuts, and the cutting amount per one time of the machining program, similarly to the action information output in the process of Q-learning by the action information output unit 303.

The program modifying unit 205 modifies the machining program that is currently set on the basis of the optimizing action information, to generate an operation command. As a result of this operation command, the machine tool 100 can operate so that the machining accuracy is improved and the machining cycle time becomes shorter.

The function blocks included in the numerical control device 200 and the machine learning device 300 have been described above. In order to realize these function blocks, both the numerical control device 200 and the machine learning device 300 include an operation processing device such as a central processing unit (CPU). Both the numerical control device 200 and the machine learning device 300 also include an auxiliary storage device such as a hard disk drive (HDD) storing various control programs such as application software and an operating system (OS) and a main storage device such as a random access memory (RAM) for storing data temporarily required for execution of the program by the operation processing device.

In both of the numerical control device 200 and the machine learning device 300, while reading the application software and the OS from the auxiliary storage device and decompressing the read application software and OS into the main storage device, the operation processing device performs operation processing based on the application software or OS. Both the numerical control device 200 and the machine learning device 300 control various hardware included in each device on the basis of this operation result. As a result, the function blocks of the present embodiment are realized. That is, the function blocks of the present embodiment can be realized by the cooperation of hardware and the software.

The machine learning device 300 performs a large number of operations associated with machine learning. Thus, it is desirable that, for example, a personal computer is mounted with graphics processing units (GPUs), and the GPUs are utilized for the operation processing associated with the machine learning by a technique called general-purpose computing on graphics processing units (GPGPU). The machine learning device 300 can perform high-speed processing by using the GPUs. Further, in order to perform higher speed processing, a plurality of such computers mounted with the GPUs may be used to construct a computer cluster so that the machine learning device 300 performs parallel processing using the plurality of computers included in the computer cluster.

Figure 5:
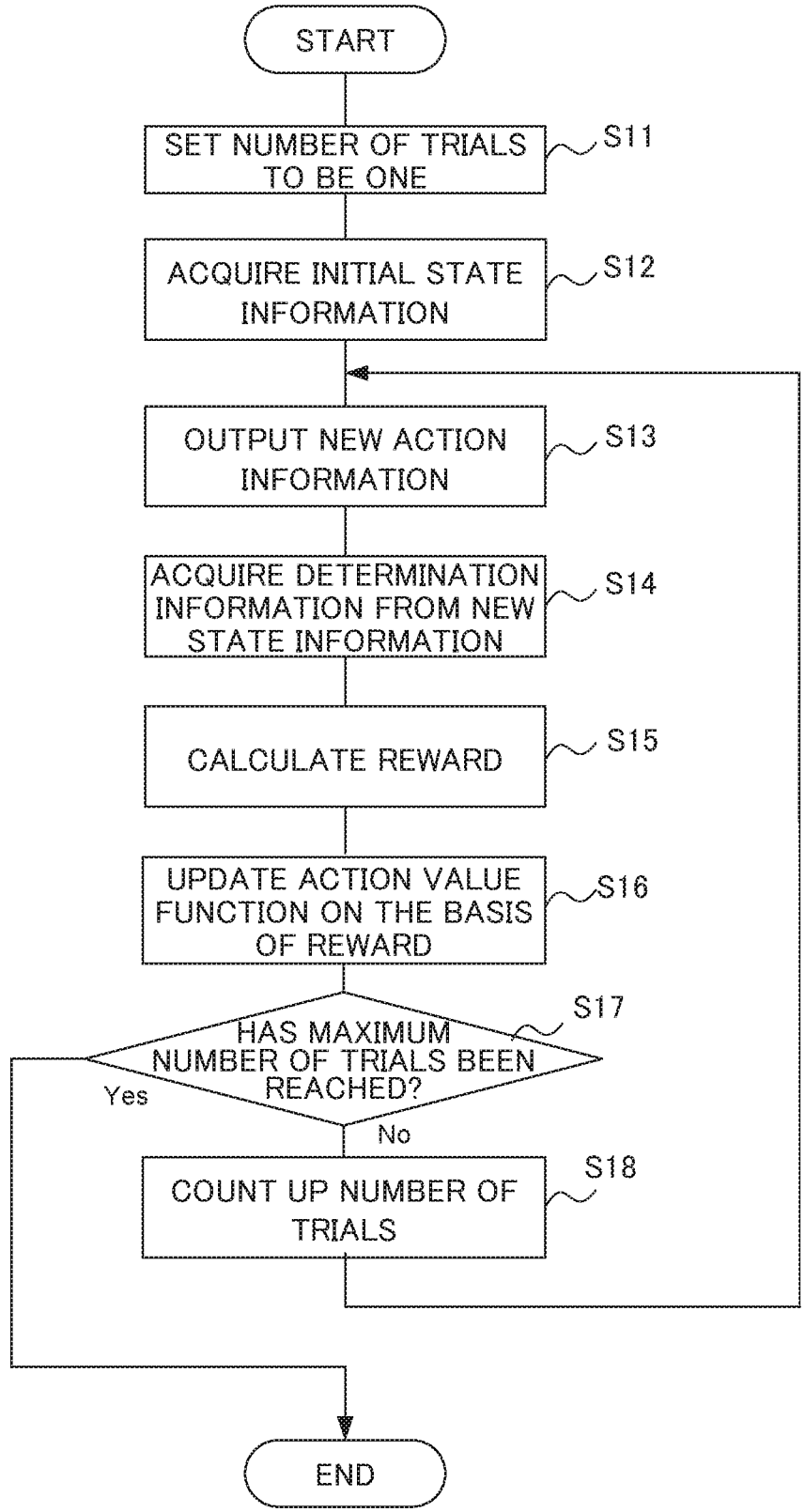
FIG. 5 is a flowchart showing the operation of the machine learning device at the time of Q-learning in the first embodiment of the present invention.
Figure 6:
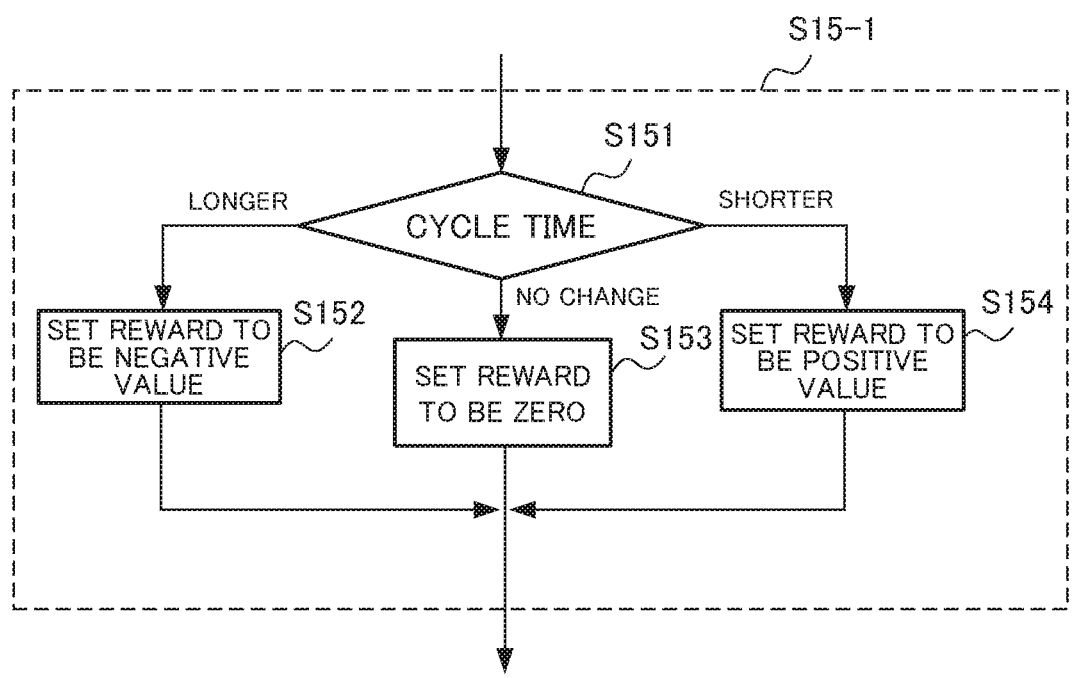
FIG. 6 is a flowchart showing a calculation method of a reward based on a cycle time of step S15 of FIG. 5.
Figure 7:
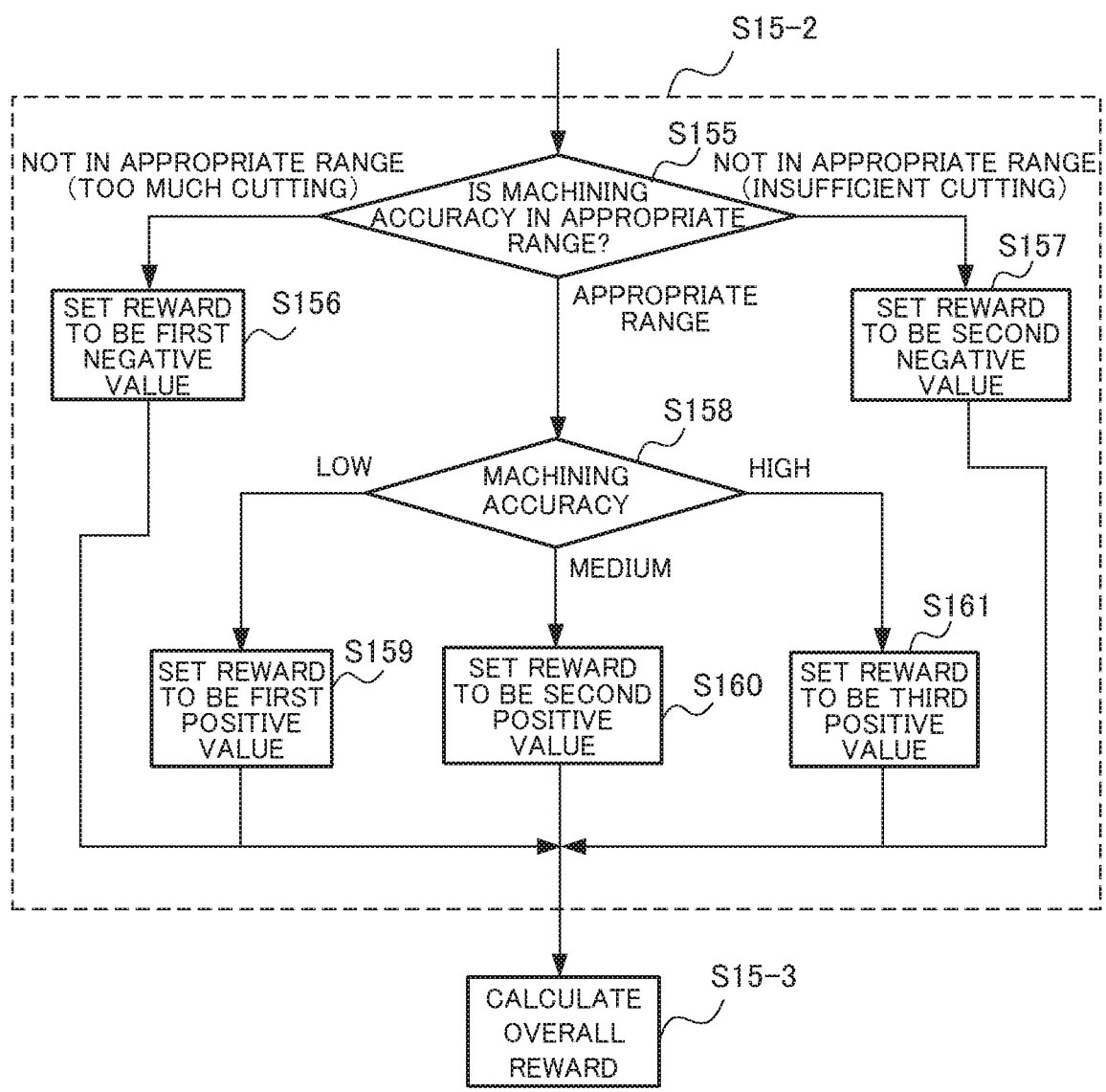
FIG. 7 is a flowchart showing a calculation method of a reward based on machining accuracy of step S15 of FIG. 5.

Next, the operation of the machine learning device 300 at the time of Q-learning in the present embodiment will be described with reference to flowcharts of FIG. 5, FIG. 6, and FIG. 7. FIG. 5 is a flowchart showing the operation of the machine learning device 300 at the time of Q learning in the present embodiment, FIG. 6 is a flowchart showing a calculation method of the reward based on the cycle time of step S15 of FIG. 5, and FIG. 7 is a flowchart showing part of a calculation method of the reward based on the machining accuracy of step S15 of FIG. 5.

First, in step S11, the control unit 306 instructs the state information acquisition unit 301 to acquire the state information, with the number of trials set to be one.

In step S12, the state information acquisition unit 301 acquires initial state information from the numerical control device 200. The acquired state information is output to the value function updating unit 3022 and the action information generation unit 3023. As described above, this state information is information corresponding to the state S in Q-learning, and includes the spindle speed, the feed rate, the number of cuts, and the cutting amount per one time of the machining program, the cycle time of when the machining processing is performed on the basis of the machining program in which these values are set, and the machining accuracy of the workpiece at the time of step S12. The setting values of the spindle speed, the feed rate, the number of cuts, and the cutting amount per one time of the machining program at the time when Q-learning is initially started are created by the user in advance. In the present embodiment, the machine learning device 300 adjusts the values of the spindle speed, the feed rate, the number of cuts, and the cutting amount per one time of the machining program created by the user to be more optimal values through reinforcement learning.

In step S13, the action information generation unit 3023 generates new action information A, to output the generated new action information A to the program modifying unit 205 of the numerical control device 200 via the action information output unit 303. The program modifying unit 205, which has received the action information, modifies the spindle speed, the feed rate, the number of cuts, and the cutting amount per one time of the machining program related to the current state S on the basis of the received action information and makes it the state S'. The numerical control information processing unit 203 causes cutting by driving the machine tool 100 according to the modified state S'.

In step S14, the state information acquisition unit 301 acquires state information corresponding to the new state S' acquired from the numerical control device 200. The new state information includes the value of the spindle speed, the feed rate, the number of cuts, and the cutting amount per one time of the machining program related to the state S', the cycle time that was required for performing the machining processing related to the state S', and the machining accuracy of the workpiece created by the machining processing related to the state S'. The cycle time that was required for performing the machining processing related to the state S' and the machining accuracy of the workpiece created by the machining processing related to the state S' are determination information. The state information acquisition unit 301 outputs the acquired state information to the learning unit 302.

In step S15, the reward output unit 3021 calculates the reward on the basis of the determination information that has been input, that is, the cycle time and the machining accuracy. Step S15 includes steps of calculating the reward on the basis of the cycle time, calculating the reward on the basis of the machining accuracy, and calculating the overall reward on the basis of the reward based on the cycle time and the reward based on the machining accuracy.

The step of calculating the reward on the basis of the cycle time is shown in step S15-1 in FIG. 6. As shown in step S15-1, in step S151, the reward output unit 3021 first determines whether the cycle time value T(S') that was required for performing machining processing related to the state S' is longer than, shorter than, or unchanged from the cycle time value T(S) that was required for performing the machining processing related to the state S. When the cycle time value T(S')>the cycle time value T(S), the reward output unit 3021 sets the reward to be a negative value in step S152. When the cycle time value T(S')=the cycle time value T(S), the reward output unit 3021 sets the reward to be zero in step S153. When the cycle time value T(S')<the cycle time value T(S), the reward output unit 3021 sets the reward to be a positive value in step S154.

The step of calculating the reward on the basis of the machining accuracy is shown in step S15-2 of FIG. 7. The reward output unit 3021 first determines whether the machining accuracy of the screw manufactured in the workpiece is in the appropriate range, in step S155. When the machining accuracy is not in the appropriate range, the reward output unit 3021 sets the reward to be a negative value. Too much cutting and insufficient cutting are considered to be outside of the appropriate range. Here, the reward output unit 3021 sets the reward to be a negative first value in step S156 in the case of being not in the appropriate range due to too much cutting, and sets the reward to be a negative second value that is smaller than the negative first value in step S157 in the case of insufficient cutting. The reward in the case of too much cutting is set to be a negative value that is larger than the reward in the case of insufficient cutting, since an overly cut portion cannot be repaired and, therefore, too much cutting is less preferable than insufficient cutting.

When the machining accuracy is in the appropriate range, in step S158, the reward output unit 3021 determines which of the "high," "medium," and "low" tolerance classifications of the tolerance quality of the female screw the machining accuracy of the workpiece corresponds to. When the tolerance quality is "low", in step S159, the reward output unit 3021 sets the reward to be a first positive value. When the tolerance quality is "medium", in step S160, the reward output unit 3021 sets the reward to be a second positive value that is larger than the first positive value. When the tolerance quality is "high", in step S161, the reward output unit 3021 sets the reward to be a third positive value that is larger than the second positive value. As has been already described, the way to give the reward value is not limited thereto.

The step of calculating the overall reward on the basis of the reward based on the cycle time and the reward based on the machining accuracy is shown in step S15-3 of FIG. 7. Step S15-3 is a step of calculating the overall reward by, for example, summing, weight summing, or determining an average value with respect to the reward based on the cycle time and the reward based on the machining accuracy.

When step S15 ends, in step S16, the value function updating unit 3022 updates the value function Q stored in the value function storage unit 304 on the basis of the overall reward value. Next, in step S17, the control unit 306 determines whether the maximum number of trials has been reached. The maximum number of trials is set in advance. When the maximum number of trials is not reached, the control unit 306 counts up the number of trials in step S18 and returns the processing to step S13. The processing from step S13 to step S18 is repeated until the maximum number of trials is reached. Here, the processing ends when the number of trials reaches the maximum number of trials. However, the processing may end with a condition that the processing from step S13 to step S18 is repeated for a predetermined time. Although online updating is exemplified in step S16, batch updating or mini-batch updating may be performed instead of the online updating.

As described above, by the operation described with reference to FIG. 5, FIG. 6, and FIG. 7, the present embodiment exhibits an effect capable of generating the value function Q for generating the action information for reducing the cycle time while improving the machining accuracy of the workpiece.

Figure 8:
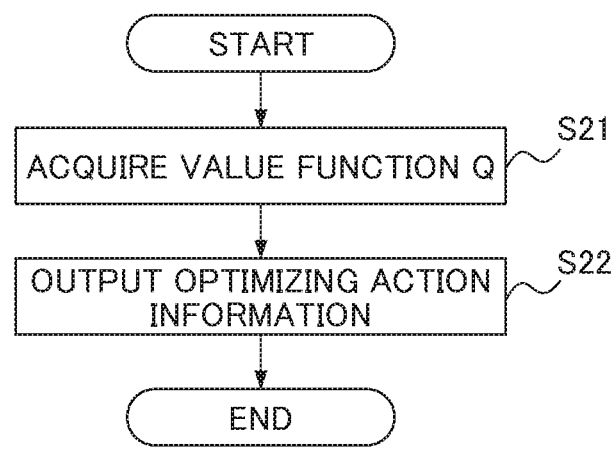
FIG. 8 is a flowchart showing operation at the time of generation of optimizing action information by an optimizing action information output unit.

Next, operation at the time of generation of optimizing action information by the optimizing action information output unit 305 will be described with reference to a flowchart of FIG. 8. First, in step S21, the optimizing action information output unit 305 acquires the value function Q stored in the value function storage unit 304. The value function Q is a function that has been updated by performing Q-learning by the value function updating unit 3022 as described above.

In step S22, the optimizing action information output unit 305 generates the optimizing action information on the basis of the value function Q to output the generated optimizing action information to the program modifying unit 205 of the numerical control device 200.

As described above, the numerical control device 200 modifies the machining program that is currently set on the basis of the optimizing action information to generate the operation command. As a result of this operation command, the machine tool 100 exhibits an effect of operating so that the machining cycle time is shorter while improving the machining accuracy of the workpiece.

Effects of the present embodiment will be described below on the basis of some examples.

EXAMPLE 1

Example 1 is an example of when the maximum time of trials is provided after the machine learning device 300, for example, performs machine learning of taking a measure of mainly selecting the action A with which the spindle speed and/or the feed rate are made faster, and then, a spindle speed S and a feed rate F become fast and the cycle time becomes short. The machine learning was performed on the basis of the machine learning operation shown in FIG. 5 by using the machine tool 100, the numerical control device 200, and the machine learning device 300 shown in FIG. 2 to FIG. 4. The reward value in the machine learning was set as below. The reward value based on the cycle time was set to be −5 when the cycle time value became longer, +5 when the cycle time value remained unchanged, and +10 when the cycle time value became shorter. The reward value based on the machining accuracy was set to be +10 when the machining accuracy was in the appropriate range. That is, the reward values based on the machining accuracy were set to be the same +10 irrespective of the tolerance quality of "high," "medium," or "low."

In output data before the machine learning, the spindle speed S was 758 [rev/min], and the feed rate F was 455 [rev/min]. As a result of the machine learning, in the output data after the machine learning, the spindle speed S was 909 [rev/min], and the feed rate F was 682 [rev/min].

EXAMPLE 2

Example 2 is an example of when the maximum time of trials is provided, the machine learning of, for example, taking a measure of mainly selecting the action A with which the cutting amount J was increased and/or the number of cuts was decreased is performed, and then, the cutting amount J is increased, the number of cuts L is decreased, and the machining path becomes short, and thereby, the cycle time is reduced. Even in Example 2, similarly to Example 1, machine learning was performed on the basis of the machine learning operation shown in FIG. 5 by using the machine tool 100, the numerical control device 200, and the machine learning device 300 shown in FIG. 2 to FIG. 4. The reward value based on the cycle time and the reward value based on the machining accuracy were also the same as those in Example 1.

When the total cutting amount in the diameter direction was 1.2 [mm], in the output data before the machine learning, the cutting amount per one time J was 0.3 [mm] and the number of cuts L was 4 [times]. As a result of the machine learning, in the output data after the machine learning, the cutting amount per one time J was 0.4 [mm] and the number of cuts was 3 [times].

<Variations>

In the embodiment described above, the machine learning device 300 performs machine learning with the maximum number of trials determined. However, the machine learning may be continued without the maximum number of trials determined. When the maximum number of trials is not determined, the machining condition is adjusted so that the machining accuracy depending on the situation is improved. Thus, even when the tool becomes old and its sharpness has deteriorated, machining can be performed with the optimal machining condition at that time. Therefore, that is effective for extending the lifespan of a tool.

An effect of when the machine learning device 300 continues the machine learning without the maximum number of trials determined will be described below on the basis of an example. The present example is an example in which the machine learning device 300 performs the machine learning without the maximum number of trials determined, and even when the cutting amount is decreased, the spindle speed S and the feed rate F are adjusted. In the present example, similarly to Example 1, the machine learning was performed on the basis of the machine learning operation shown in FIG. 5 by using the machine tool 100, the numerical control device 200, and the machine learning device 300 shown in FIG. 2 to FIG. 4. The reward value based on the cycle time and the reward value based on the machining accuracy were also the same as in Example 1. In Example 3, since the maximum number of trials was not provided, step S17 and step S18 of FIG. 5 were not provided and the machine learning device 300 repeated steps S12 to S16. As result of the machine learning, in output data at one time point, the spindle speed S was 758 [rev/min], the feed rate F was 455 [rev/min], the cutting amount per one time J was 0.4 [mm], and the time of cutting L was 3 [times]. In the output data at a time point after the machine learning was continued, the spindle speed S was 909 [rev/min], the feed rate F was 682 [rev/min], the cutting amount per one time J was 0.3 [mm], and the number of cuts L was 4 [times].

<Another Variation>

In the embodiments described above, if the machining program is created with a coordinate including a tool diameter, when a different tool needs to be used, all coordinates need to be modified. There is also a case where the path needs to be compensated due to abrasion of the tool. Thus, a function called tool diameter compensation is provided in the machining program. In the embodiments described above, a tool diameter compensation amount may be adjusted instead of the cutting amount per one time, or the tool diameter compensation amount may be adjusted in addition to the cutting amount per one time. The tool diameter compensation amount corresponds to the tool compensation amount.

In the embodiment described above, the machine tool performing thread milling machining is described as an example of the machine tool 100. However, the machine tool 100 is not limited thereto and may be a machine tool performing machining such as inner diameter machining, an outer shape machining, a surface machining, or the like. Examples of the outer shape machining and the surface machining will be described as the second and third embodiments.

Second Embodiment

Figure 9:
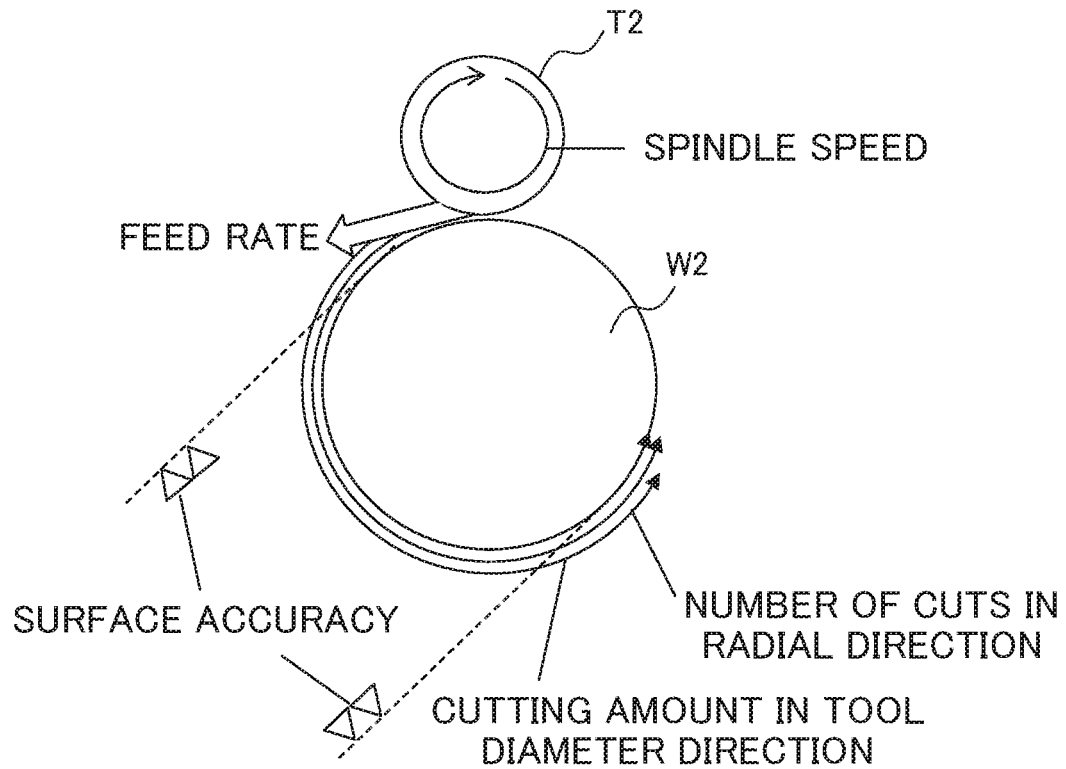
FIG. 9 is an explanatory diagram of an outer shape machining.

A second embodiment of the present invention relates to a numerical control system of when the outer shape machining is performed by the machine tool. Since the numerical control device and the machine learning device used in the present embodiment have the same configurations as the configuration of the numerical control device and the machine learning device described in the first embodiment, descriptions thereof are omitted. FIG. 9 is an explanatory diagram of the outer shape machining. As shown in FIG. 9, the machine tool moves the tool T2 while rotating the tool T2 to perform the outer shape machining of an outer periphery of the workpiece W2. Regarding the outer shape machining, in consideration of the base materials of the tool T2 and the workpiece W2, in order to achieve a short machining time while maintaining surface accuracy that is machining accuracy of the outer periphery of the workpiece W2, as shown in FIG. 9, adjustment of the spindle speed, the feed rate, the number of cuts in the tool diameter direction, and the cutting amount in the tool diameter direction of the spindle that rotates the tool T2 is required. The state information in the machine learning in the second embodiment is the same as the state information in the first embodiment except for the machining accuracy of the workpiece being the surface accuracy. The surface accuracy is measured by a three-dimensional measurement device or the like. The surface accuracy is a value indicating an extent to which the machined surface deviates from the target surface.

Figure 10:
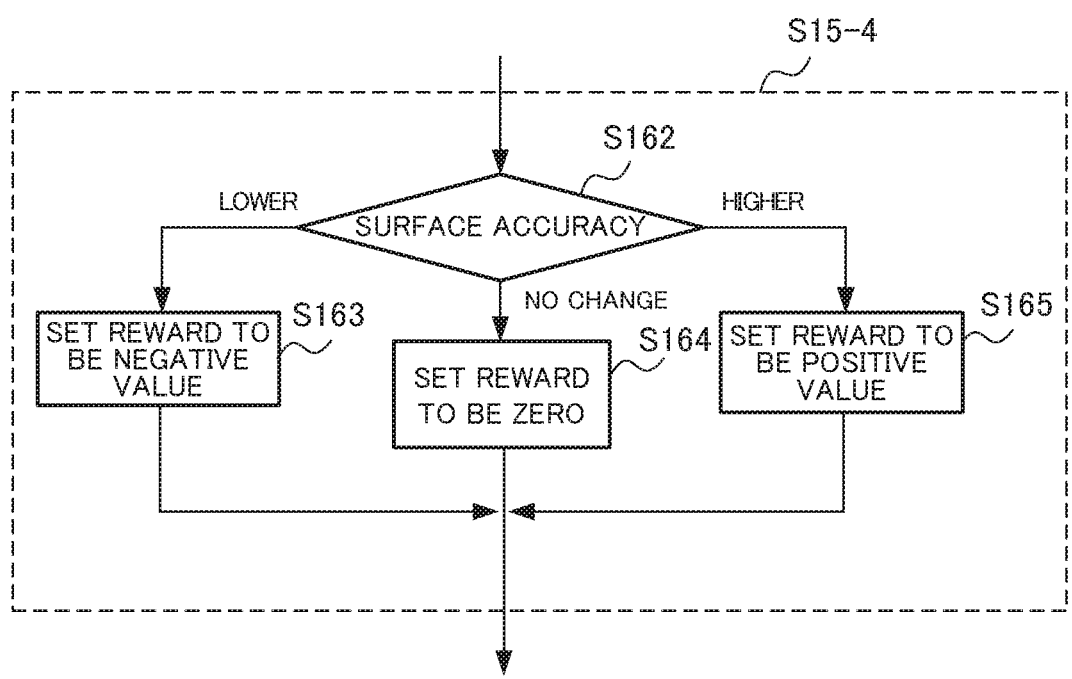
FIG. 10 is a flowchart showing a calculation method of a reward based on surface accuracy in the operation of the machine learning device at the time of Q-learning in the first embodiment of the present invention.

The operation of the machine learning device 300 at the time of Q-learning in the second embodiment is different from the operation of the first embodiment, in that step S15-4 shown in FIG. 10 is used instead of step S15-2 of calculating the reward on the basis of the machining accuracy shown in FIG. 7.

As shown in step S15-4, the reward output unit 3021 shown in FIG. 4, first, in step S162, determines whether the surface accuracy of the workpiece manufactured by the machining processing related to the state S' is lower than, remains unchanged from, or is higher than the surface accuracy of the workpiece manufactured by the machining processing related to the state S. When the surface accuracy is decreased, the reward output unit 3021 sets the reward to be a negative value in step S163. When the surface accuracy remains unchanged, the reward output unit 3021 sets the reward to be zero in step S164. When the surface accuracy is improved, the reward output unit 3021 sets the reward to be a positive value in step S165.

The reward output unit 3021 may set the reward to be a positive value when the surface accuracy remains unchanged and set the reward for when the surface accuracy has improved to be a positive value that is larger than the reward for when the surface accuracy remains unchanged.

A negative value for when the surface accuracy of the workpiece manufactured by the machining processing related to the state S' after performing of the action A is decreased to be lower than the surface accuracy of the workpiece manufactured by the machining processing related to the prior state S may be made larger in magnitude in accordance with a ratio. That is, the negative value may be made larger in magnitude in accordance with a degree of decrease of the surface accuracy. On the other hand, the positive value for when the surface accuracy of the workpiece manufactured by the machining processing related to the state S' after performing of the action A is improved to be more than the surface accuracy of the workpiece manufactured by the machining processing related to the prior state S may become larger in accordance with the ratio. That is, the positive value may be made larger in accordance with the degree of improvement of the surface accuracy.

Third Embodiment

Figure 11:
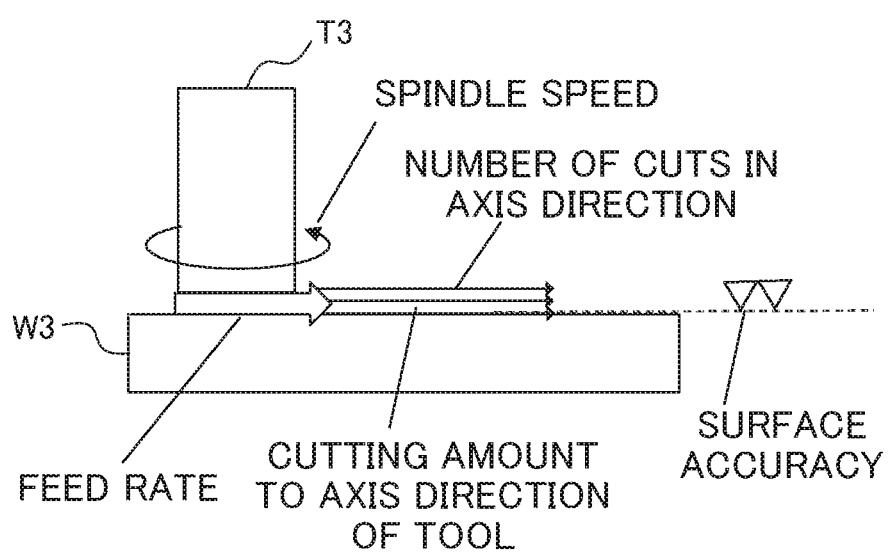
FIG. 11 is an explanatory diagram of surface machining.

A third embodiment of the present invention relates to a numerical control system for when surface machining is performed by a machine tool. Since the numerical control device and the machine learning device used in the present embodiment have the same configurations as the configurations of the numerical control device and the machine learning device described in the first embodiment, descriptions thereof are omitted. FIG. 11 is an explanatory diagram of the surface machining. The machine tool performs surface machining on the machining surface of a workpiece W3 by linearly moving the tool T3 while rotating the tool T3. Regarding the surface machining, in consideration of the base materials of the tool T3 and the workpiece W3, in order to achieve a short machining time while maintaining surface accuracy that is machining accuracy of the machining surface of the workpiece W3, as shown in FIG. 11, adjustment of the spindle speed, the feed rate, the number of cuts in the axis direction of the tool, and the cutting amount in the axis direction of the tool of the spindle that, rotates the tool T3 is required.

The third embodiment is the same as the first embodiment except for the machining accuracy of the workpiece being the surface accuracy, and the number of cuts and the cutting amount not being in the tool diameter direction but in the axis direction of the tool in the state information in the machine learning in the third embodiment. The surface accuracy is measured by a three-dimensional measurement device or the like. The surface accuracy is a value indicating an extent to which the machined surface deviates from the target surface. The tool diameter compensation amount in the first embodiment is a tool length compensation amount in the third embodiment. The tool length compensation amount corresponds to the tool compensation amount. A step of calculating the reward on the basis of the machining accuracy is the same as step S15-4 of the second embodiment.

The embodiments of the present invention have been described above. Both the numerical control device and the machine learning device may be realized by hardware, software, or combination thereof. The machine learning method performed by the cooperation of both the numerical control device and the machine learning device described above also may be realized by hardware, software, or combination thereof. Being realized by software means being realized by a computer reading and executing a program.

The program may be stored by using various types of non-transitory computer readable media and supplied to the computer. The non-transitory computer readable media include various types of tangible storage media. Examples of the non-transitory computer readable media include a magnetic recording medium (for example, a flexible disk or a hard disk drive), a magneto-optical recording medium (for example, a magneto-optical disk), a CD-ROM (read-only memory), a CD-R, a CD-R/W, a semiconductor memory (for example, a mask ROM, a programmable ROM (PROM), an erasable PROM (EPROM), a flash ROM, or a random access memory (RAM).

Although the embodiments described above is a preferable embodiment of the present invention, the scope of the present invention is not limited to the embodiments described above. The present invention may be performed in an embodiment in which various modifications are made without departing from the scope of the present invention.

<Variations>

In the first to third embodiments described above, the machine learning device 300 is realized by a different device from the tool machine 100 and the numerical control device 200. However, part or all of the functions of the machine learning device 300 may be realized by the tool machine 100 or the numerical control device 200. The optimizing action information output unit 305 of the machine learning device 300 may be a different optimizing action information output device from the machine learning device 300. In this case, one or a plurality of optimizing action information output devices may be provided with respect to a plurality of machine learning devices 300, to be used with sharing.

<Degree of Freedom with System Configuration>

In the embodiments described above, the machine learning device 300 and the numerical control device 200 are communicatively connected as a set of one-to-one. However, for example, one machine learning device 300 may be communicatively connected to a plurality of numerical control devices 200 via the network 400 to perform machine learning of each numerical control device 200. At that time, respective functions of the machine learning device 300 may be realized by a distributed processing system in which the functions are distributed in a plurality of servers as appropriate. The functions of the machine learning device 300 may be realized by utilizing a virtual server function or the like in the cloud.

When there are a plurality of machine learning devices 300-1 to 300-$n$ corresponding to a plurality of numerical control devices 200-1 to 200-$n$, respectively of the same type name, the same specification, or the same series, the numerical control system 10 may be configured so that learning results in the machine learning devices 300-1 to 300-$n$ are shared. As a result, a more optimal model can be constructed.

EXPLANATION OF REFERENCE NUMERALS

10 Numerical control system
100, 100-1 to 100-$n$ Machine tool
101 Spindle motor
102 Axis servo motor
103 Cycle counter
200, 200-1 to 200-$n$ Numerical control device
201 Spindle motor control unit
202 Axis servo motor control unit
203 Numerical control information processing unit
204 Storage unit
300, 300-1 to 300-$n$ Machine learning device
301 State information acquisition unit
302 Learning unit
303 Action information output unit
304 Value function storage unit
305 Optimizing action information output unit
400 Network

What is claimed is:

1. A machine learning device configured to perform machine learning with respect to a numerical control device that operates a machine tool on the basis of a machining program, the machine learning device comprising:
at least one processor configured to:
acquire state information including a setting value, a cycle time of cutting a workpiece, and a machining accuracy of the workpiece, the setting value including a spindle speed, a feed rate, a number of cuts, a cutting amount per one time, and a tool compensation amount;

select action information including modification information of a setting value of at least the number of cuts, the cutting amount per one time, and the tool compensation amount included in the state information based on a measure of selecting an action with which the cutting amount per one time is increased and/or the number of cuts are decreased, and output the action information thus selected to the numerical control device;

output a reward value in reinforcement learning on the basis of the cycle time and the machining accuracy included in the state information; and update an action value function on the basis of the reward value that has been output, the state information, and the action information, wherein the spindle speed, the feed rate, the number of cuts, the cutting amount per one time, and the tool compensation amount are set in a predetermined machining program, the numerical control device causes the machine tool to perform cutting by executing the machining program, and the cycle time and the machining accuracy are acquired by the numerical control device performing the machining program.

2. The machine learning device according to claim 1, wherein the machine learning is continued without a maximum number of trials of the machine learning being provided.

3. The machine learning device according to claim 1, wherein the machine learning is performed in any of thread milling machining, inner diameter machining, outer shape machining, and surface machining of the machine tool.

4. The machine learning device according to claim 1, wherein the at least one processor is further configured to generate and output the spindle speed, the feed rate, the number of cuts, the cutting amount per one time, and the tool compensation amount on the basis of the action value function that has been updated.

5. A numerical control system comprising:
the machine learning device according to claim 1; and
a numerical control device in which the spindle speed, the feed rate, the number of cuts, the cutting amount per one time or time, and the tool compensation amount of the machining program are machine learned by the machine learning device.

6. A numerical control device comprising the machine learning device according to claim 1, the numerical control device being configured to perform machine learning of the spindle speed, the feed rate, the number of cuts, the cutting amount per one time, and the tool compensation amount of a machining program by the machine learning device.

7. A machine learning method of a machine learning device configured to perform machine learning with respect to a numerical control device that operates a machine tool on the basis of a machining program, the machine learning method performed by at least one processor of the machine learning device, the machine learning method comprising:
acquiring state information including a setting value, a cycle time of cutting a workpiece, and a machining accuracy of the workpiece, the setting value including a spindle speed, a feed rate, a number of cuts, a cutting amount per one time, and a tool compensation amount;

selecting action information including modification information of a setting value of at least the number of cuts, the cutting amount per one time, and the tool compensation amount included in the state information based on a measure of selecting an action with which the cutting amount per one time is increased and/or the number of cuts are decreased, and outputting the action information thus selected to the numerical control device;

calculating a reward value in reinforcement learning based on the cycle time and the machining accuracy included in the state information; and updating an action value function on the basis of the reward value that has been calculated, the state information, and the action information, wherein the spindle speed, the feed rate, the number of cuts, the cutting amount per one time, and the tool compensation amount are set in a predetermined machining program, the numerical control device causes the machine tool to perform cutting by executing the machining program, and the cycle time and the machining accuracy are acquired by the numerical control device executing the machining program.

* * * * *